(12) United States Patent
Wang et al.

(10) Patent No.: US 10,333,171 B2
(45) Date of Patent: Jun. 25, 2019

(54) HEXACYANOMETALLATES AS HIGHLY CONDUCTING SOLID ELECTROLYTES FOR BATTERIES

(71) Applicant: The Board of Trustees of the Leland Stanford Junior University, Stanford, CA (US)

(72) Inventors: Richard Wang, Stanford, CA (US); Yi Cui, Stanford, CA (US); Mauro Pasta, Ubiale Clanezzo (IT)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 338 days.

(21) Appl. No.: 15/258,732

(22) Filed: Sep. 7, 2016

(65) Prior Publication Data

US 2017/0069931 A1    Mar. 9, 2017

Related U.S. Application Data

(60) Provisional application No. 62/215,426, filed on Sep. 8, 2015.

(51) Int. Cl.
*H01M 10/0562* (2010.01)
*H01M 10/0525* (2010.01)
*H01M 4/38* (2006.01)

(52) U.S. Cl.
CPC ....... *H01M 10/0562* (2013.01); *H01M 4/382* (2013.01); *H01M 10/0525* (2013.01); *H01M 2220/20* (2013.01); *H01M 2300/0068* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2013/0260222 A1* 10/2013 Lu ........................... H01M 4/58
429/188
2014/0125292 A1* 5/2014 Best ................... H01M 10/0525
320/137

FOREIGN PATENT DOCUMENTS

EP    0197465 A2    10/1986

OTHER PUBLICATIONS

Wessells, C. D., et al., "Copper hexacyanoferrate battery electrodes with long cycle life and high power", Nat. Commun., 2011, 2:550.
(Continued)

*Primary Examiner* — Wojciech Haske
(74) *Attorney, Agent, or Firm* — Foley & Lardner LLP; Cliff Z. Liu

(57) ABSTRACT

Described here is a solid-state lithium-ion battery, comprising a cathode, an anode, and a solid-state electrolyte disposed between the cathode and the anode, wherein the electrolyte comprises a hexacyanometallate represented by $A_xP_y[R(CN)_{6-w}L_w]_z$, wherein: A is at least one alkali metal cation, P is at least one transition metal cation, at least one post-transition metal cation, and/or at least one alkaline earth metal cation, R is at least one transition metal cation, L is an anion, x, y, and z are related based on electrical neutrality, x>0, y>0, z>0, and 0≤w≤6.

22 Claims, 13 Drawing Sheets

(56) References Cited

OTHER PUBLICATIONS

Wessells, C. D., et al., "Nickel hexacyanoferrate nanoparticle electrodes for aqueous sodium and potassium ion batteries", Nano Lett., 2011, 11:5421-5425.
Pasta, M., et al., "A high-rate and long cycle life aqueous electrolyte battery for grid-scale energy storage", Nat. Commun., 2012, 3:1149.
Pasta, M. et al., "Full open-framework batteries for stationary energy storage", Nat. Commun., 2014 5:3007.
Lee, H.-W., et al., "Manganese hexacyanomanganate open framework as a high-capacity positive electrode material for sodium-ion batteries", Nat. Commun. 2014, 5:5280.
Lu, Y., et al., "Prussian Blue: a new framework of electrode materials for sodium batteries", Chem. Commun., 2012, 48:6544-6546.
Wang, L., et al., "A Superior Low-cost Cathode for a Na-ion Battery", Angew. Chemie Int. Ed., 2013, 52:1964-1967.
Song, J., et al., "Removal of Interstitial H2O in Hexacyanometallates for a Superior Cathode of a Sodium-Ion Battery", J. Am. Chem. Soc., 2015, 137:2658-2664.
Wang, L., et al., "Rhombohedral Prussian White as Cathode for Rechargeable Sodium-Ion Batteries", J. Am. Chem. Soc., 2015, 137:2548-2554.
Wessells, C.D., et al., "Tunable reaction potentials in open framework nanoparticle battery electrodes for grid-scale energy storage", ACS Nano, 2012, 6:1688-1694.
Wessells, C.D., et al., "The effect of insertion species on nanostructured open framework hexacyanoferrate battery electrodes", J. Electrochem. Soc., 2012, 159:A98-A103.
Wang, R.Y., et al., "Highly reversible open framework nanoscale electrodes for divalent ion batteries", Nano Lett., 2013, 13:5748-5752.
Lee, H.-W., et al., "Effect of the Alkali Insertion Ion on the Electrochemical Properties of Nickel Hexacyanoferrate Electrodes", Faraday Discuss., 2014, 176:69-81.
Wang, R.Y., et al., "Reversible Multivalent (Monovalent, Divalent, Trivalent) Ion Insertion in Open Framework Materials", Adv. Energy Mater., 2015, doi:10.1002/aenm.201401869.
Asakura, D., et al., "Fabrication of a Cyanide-Bridged Coordination Polymer Electrode for Enhanced Electrochemical Ion Storage Ability", J. Phys. Chem. C, 2012, 116:8364-8369.
Pajerowski, D.M., et al., "Electronic conductivity in Berlin green and Prussian blue", Phys. Rev. B, 2011, 83:153202.
Kurihara, Y., et al., "Electrochemical, structural, and electronic properties of Mn—Co hexacyanoferrates against Li concentration", Jpn. J. Appl. Phys., 2014, 53:067101.
Honda, K., et al., "Polymerization of Transition Metal Complexes in Solid Polymer Electrolytes", J. Chem. Soc., Chem. Commun., 1986, 168-170.
Honda, K., et al., "Prussian Blue Containing Nafion Composite Film as Rechargeable Battery", J. Electrochem. Soc.: Electrochemical Science and Technology, Jun. 1987, 1330-1334.
Honda, K., et al., "Polymerization of Transition Metal Complexes in Solid Polymer Electrolyte Membranes", J. Macromol. Sci.-Chem., 1989, A26(2&3):609-620.
Huggins, R.A., "Solid Electrolyte Battery Materials", Office of Naval Research Contract N00014-67A-0112-0075, Task No. NR 056-555, Technical Report No. 2, Mar. 31, 1974, 39 pages.

\* cited by examiner

- Co, Mn
- Fe
- Na

HEXACYANOMETALLATES AS HIGHLY CONDUCTING SOLID ELECTROLYTES FOR BATTERIES

CROSS-REFERENCE TO RELATED APPLICATIONS

This application claims the benefit of U.S. Provisional Patent Application No. 62/215,426 filed Sep. 8, 2015, the content of which is incorporated herein by reference in its entirety.

STATEMENT REGARDING FEDERALLY SPONSORED RESEARCH OR DEVELOPMENT

This invention was made with Government support under contract DE-AC05-76RL01830 awarded by the Department of Energy. The Government has certain rights in the invention.

BACKGROUND

Rechargeable lithium-ion batteries have revolutionized the portable electronics industry because of their energy density and efficiency. They may also prove valuable for a variety of other applications, including electrification of the transport system and grid-scale stationary energy storage.

However, they suffer from a number of problems, including limited energy and power density, flammability of the liquid organic electrolyte, instability at elevated temperature, short circuits due to lithium dendrites, and decay in energy and power with cycling and long-term storage. Most of these problems are related in some way to the use of unstable liquid or gel organic electrolytes to transfer lithium ions between the electrodes. Replacing this liquid with a solid electrolyte could alleviate these problems.

For instance, the chemical and mechanical stability of the solid electrolyte allows the use of a metallic lithium anode combined with a high-voltage cathode, neither of which is stable in a conventional electrolyte. Such a system would greatly increase the energy and power density compared to a conventional battery (e.g., metallic lithium has a gravimetric capacity that is about 10 times greater than that of graphite). Moreover, the increased energy/power density could greatly reduce material and manufacturing costs since fewer battery cells would be needed for a given application.

Indeed, studies have already demonstrated high-voltage solid-state batteries with less than 10% capacity decay after 10,000 cycles. However, most of the current candidate materials do not transfer lithium ions between the electrodes quickly enough compared to liquid electrolytes. This limits their application to low-power or low-energy thin-film batteries, which are expensive to manufacture and do not provide enough power for electric vehicles. A few material systems have shown promising ionic conductivity, but they suffer from a variety of problems, including electrochemical instability, chemical reactivity with metal oxide cathodes and lithium metal anodes, high cost, complicated fabrication, and high electronic conductivity.

SUMMARY

Many embodiments relate to a solid-state lithium-ion battery, comprising a cathode, an anode, and a solid-state electrolyte disposed between the cathode and the anode, wherein the electrolyte comprises a hexacyanometallate represented by $A_xP_y[R(CN)_{6-w}L_w]_z$, wherein: A is at least one alkali metal cation, P is at least one transition metal cation, at least one post-transition metal cation, and/or at least one alkaline earth metal cation, R is at least one transition metal cation, L is an anion, x, y, and z are related based on electrical neutrality, $x>0$, $y>0$, $z>0$, and $0 \leq w \leq 6$.

In some embodiments, the anode comprises lithium metal.

In some embodiments, A comprises one or more of $Li^+$, $Na^+$, $K^+$, $Rb^+$ and $Cs^+$.

In some embodiments, A comprises $Li^+$.

In some embodiments, A comprises $Rb^+$ or $Cs^+$.

In some embodiments, P comprises at least one transition metal cation.

In some embodiments, P comprises cations of at least two different transition metals.

In some embodiments, P comprises at least one post-transition metal cation.

In some embodiments, P comprises at least one alkaline earth metal cation.

In some embodiments, P comprises at least one alkaline earth metal cation, and wherein A comprises $Rb^+$ or $Cs^+$.

In some embodiments, P comprises a combination of transition metal, post-transition metal, and/or alkaline earth cations.

In some embodiments, R is selected from cations of Fe, Mn, Cr, and Co.

In some embodiments, the hexacyanometallate is represented by $A_xP_y[Fe(CN)_6]_z$.

In some embodiments, the hexacyanometallate has an ionic conductivity of about $10^{-4}$ S/cm or more.

In some embodiments, the hexacyanometallate has an electronic conductivity of about $10^{-8}$ S/cm or less.

In some embodiments, the hexacyanometallate is electrochemically and/or chemically stable when cycled in contact with lithium metal from 0 to 5 V versus $Li/Li^+$.

In some embodiments, the hexacyanometallate is substantially electrochemically inactive during operation of the battery.

In some embodiments, the battery is substantially free of a liquid electrolyte or a polymer electrolyte.

In some embodiments, the battery is substantially free of an electrode comprising a hexacyanometallate.

Additional embodiments relate to a solid-state lithium-ion battery, comprising a cathode, a lithium metal anode, and a solid-state electrolyte disposed between the cathode and the lithium metal anode, wherein the solid-state electrolyte comprises at least about 50 wt. % of a hexacyanometallate.

In some embodiments, the hexacyanometallate has a Prussian Blue crystal structure through which lithium ions travel during operation of the battery. In some embodiments, the hexacyanometallate has a non-Prussian Blue crystal structure through which lithium ions travel during operation of the battery.

Additional embodiments relate to an electric vehicle comprising the solid-state lithium-ion battery described herein.

These and other features, together with the organization and manner of operation thereof, will become apparent from the following detailed description when taken in conjunction with the accompanying drawings.

BRIEF DESCRIPTION OF THE DRAWINGS

FIGS. 3A-3B X-ray diffractograms of CuHCFe show peaks that shift to higher Q (smaller lattice parameter) as the material is reduced by the insertion of $Rb^+$. The material maintains its face-centered cubic structure regardless of the state of charge. The small decrease in lattice parameter and stable phase of CuHCFe with ion insertion are observed regardless of the type of ion in the structure.

FIGS. 5A-5B show electrochemical data for the MnCoHCFe(II) hybrid material with 75% Mn, while FIGS. 5C-5D show data for the material with 50% Mn. Nyquist plots on the left show the arc associated with the ionic resistance, while Arrhenius plots on the right show the activation energy associated with the Na-ion conduction process.

FIGS. 6A-6B show electrochemical data for CuHCFe(III), while FIGS. 6C-6D show data for the 50% reduced Na—CuHCFe(II/III). Nyquist plots on the left show arcs associated with the total ionic and electronic resistances at different temperatures from −10 to 70° C. for CuHCFe(III) and from 0 to 70° C. for 50% reduced Na—CuHCFe(II/III). Arrhenius plots on the right show the activation energy associated with the total Na-ion conduction process.

(FIGS. 11A-11B) The electronic conductivity of these solid electrolyte candidates can vary by orders of magnitude. The electronic behavior is often but not always ohmic.

(FIGS. 12A-12B) Different solid electrolyte candidates demonstrate different behavior when cycled while in contact with lithium on one side.

DETAILED DESCRIPTION

Introduction

Figure 1:
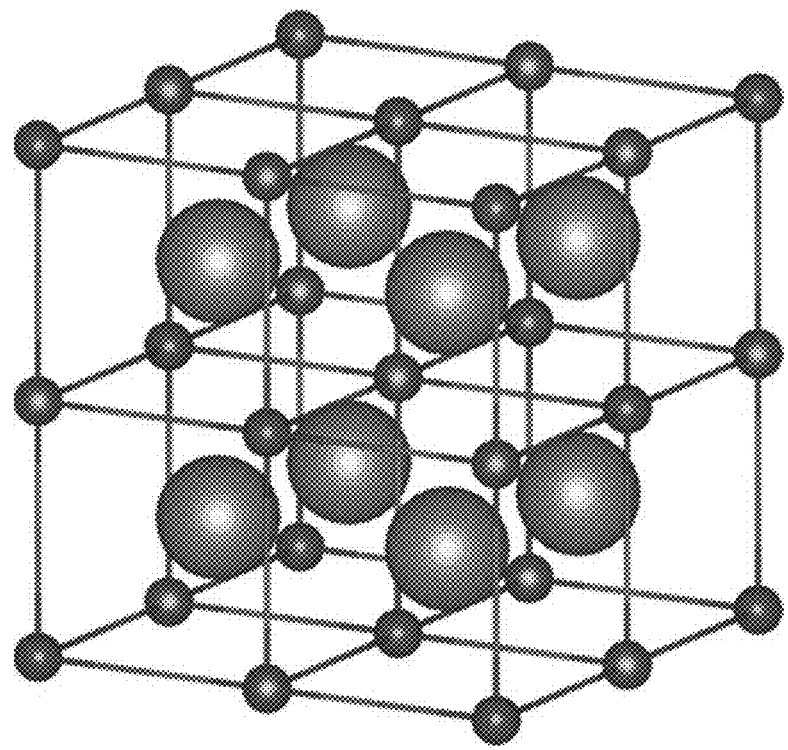
FIG. 1: The open framework crystal structure of hexacyanometallates of some embodiments is composed of a face-centered cubic framework of transition metal cations where each cation is octahedrally coordinated to hexacyanometallate groups. The structure has large open channels that allow for rapid diffusion of $Li^+$, $Na^+$, $K^+$, and many other ions.

Hexacyanometallates have remarkable electrochemical performance that is provided by rapid movement of ions through their open-framework crystal structure (FIG. 1). Hexacyanometallates exhibit high ionic conductivity for a wide variety of ions. Hexacyanometallates that are also electronically insulating, mechanically robust, have suitable chemical and electrochemical stability in a lithium-ion battery environment, and form stable ion-conducting interfaces with electrode materials would be suitable solid electrolyte candidates. The electronic, structural, and chemical properties of hexacyanometallates can be tuned by replacing/doping the framework metal ions in the structure, controlling the vacancy content of hexacyanometallate groups, changing the oxidation state of framework metal ions, or inserting a variety of alkali metal ions in interstitial sites. The tunability of the material system allows hexacyanometallates to be used as a solid electrolyte.

Solid-State Lithium-Ion Battery

Figure 13:
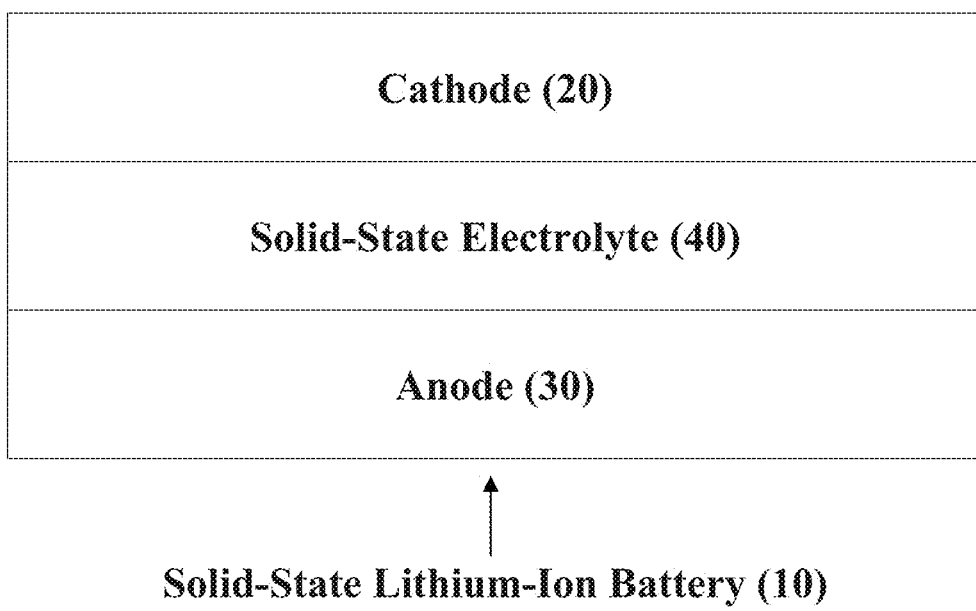
FIG. 13: A schematic drawing of a solid-state lithium-ion battery.

As shown in FIG. 13, many embodiments of the invention relate to a solid-state lithium-ion battery (10), comprising a cathode (20), an anode (30), and a solid-state electrolyte (40) disposed between the cathode and the anode, wherein the electrolyte comprises a hexacyanometallate.

The anode can comprise, for example, lithium metal, which can have a gravimetric capacity (about 3860 mAh $g^{-1}$) that is more than 10 times greater than that of graphite (about 372 mAh $g^{-1}$). The cathode can comprise, for example, a metal oxide cathode, such as $LiNi_{1/3}Mn_{1/3}Co_{1/3}O_2$, $LiNi_{0.8}Co_{0.15}Al_{0.05}O_2$, $LiCoO_2$, $LiFePO_4$, $Li_4Ti_5O_{12}$, $LiMn2O4$, $LiNi_{0.5}Mn_{1.5}O_4$, and variants thereof.

The hexacyanometallate can account for, for example, at least about 50 wt. %, or at least about 60 wt. %, or at least about 70 wt. %, or at least about 80 wt. %, or at least about 90 wt. %, or at least about 95 wt. % of the solid-state electrolyte. The hexacyanometallate can account for, for example, at least about 50 vol. %, or at least about 60 vol. %, or at least about 70 vol. %, or at least about 80 vol. %, or at least about 90 vol. %, or at least about 95 vol. % of the solid-state electrolyte.

The solid-state electrolyte can comprise a polymer electrolyte additive. The polymer electrolyte additive can account for, for example, about 30 wt. % or less, or about 20 wt. % or less, or about 10 wt. % or less, or about 5 wt. % or less of the solid-state electrolyte. The polymer electrolyte additive can account for, for example, about 30 vol. % or less, or about 20 vol. % or less, or about 10 vol. % or less, or about 5 vol. % or less of the solid-state electrolyte.

The solid-state lithium-ion battery can be substantially free of a liquid electrolyte. The solid-state lithium-ion battery can be substantially free of a polymer electrolyte such as Nafion. The solid-state lithium-ion battery can be substantially free of an electrode comprising a hexacyanometallate.

The solid-state lithium-ion battery can have a power density of, for example, more than about 1 mA cm$^{-2}$ when normalized by the cross-sectional area of the solid electrolyte. The solid-state lithium-ion battery can have a gravimetric energy density of, for example, more than about 300 Wh kg$^{-1}$ when normalized by the mass of the cathode, anode, and electrolyte materials. The solid-state lithium-ion battery can have a volumetric energy density of, for example, more than about 650 Wh L$^{-1}$ when normalized by the volume of the cathode, anode, and electrolyte materials.

Hexacyanometallate as Solid-State Electrolytes

The solid-state electrolyte can comprise a hexacyanometallate represented by formula (I): $A_xP_y[R(CN)_{6-w}L_w]_z$, wherein A corresponds to a cation that can be inserted into the crystal structure, such as selected from monovalent cations, divalent cations, and higher-valent cations;

P corresponds to a metal and, in particular, a metal cation, such as selected from monovalent metal cations, divalent metal cations, and higher-valent metal cations;

R corresponds to a metal and, in particular, a metal cation, such as selected from monovalent metal cations, divalent metal cations, and higher-valent metal cations;

CN corresponds to a cyanide group and, in particular, a cyanide anion having a valence of 1 and an oxidation state of −1, namely CN$^{-1}$;

L corresponds to a group that is optionally included to partially or fully replace CN$^{-1}$, such as selected from monovalent anions, divalent anions, and higher-valent anions;

x, y, and z are related to achieve electrical neutrality according to valencies of A, P, R, CN, and L;

$x \geq 0$, such as $x > 0$, $0 < x \leq 2$, or $0.5 \leq x \leq 1.5$;

$y \geq 0$, such as $y > 0$, $0.5 \leq y \leq 1.5$, or $0.7 \leq y \leq 1.3$;

$z \geq 0$, such as $z > 0$, $0.5 \leq z \leq 1.5$, or $0.5 \leq z \leq 1.1$; and $0 \leq w \leq 6$, such as $0 < w \leq 6$.

A material given by formula (I) can include A, P, R, CN, and L, such that molar ratios of A, P, and [R(CN)$_{6-w}$L$_w$] can be represented as A:P:[R(CN)$_{6-w}$L$_w$]=x:y:z, molar ratios of P and [R(CN)$_{6-w}$L$_w$] can be represented as P:[R(CN)$_{6-w}$L$_w$]=y:z, molar ratios of P and R can be represented as P:R=y:z, molar ratios of P and CN can be represented as P:CN=y:(6−w)·z, and molar ratios of P and L can be represented as P:L=y:w·z. In the case w=0, molar ratios of A, P, and [R(CN)$_6$] can be represented as A:P:[R(CN)$_6$]=x:y:z, molar ratios of P and [R(CN)$_6$] can be represented as P:[R(CN)$_6$]=y:z, molar ratios of P and R can be represented as P:R=y:z, and molar ratios of P and CN can be represented as P:CN=y:6z.

Some hexacyanometallates can adopt a traditional Prussian Blue open framework structure, wherein the P and R cations are octahedrally coordinated to six cyanide ligands on either the N or C end, and the framework is arranged in a cubic or cubic-like structure analogous to a perovskite structure (with cyanide ligands instead of oxygen). Hexacyanometallate vacancies may exist, but the overall framework remains unchanged. Relatively large interstitial sites within the open framework can host cations A, resulting in the formula of the form APR(CN)$_6$.

Some hexacyanometallates (e.g., Li—ZnHCFe, where HCFe denotes hexacyanoferrate) can adopt a non-cubic structure that is analogous to a NASICON structure with cyanide ligands instead of oxygen anions and with alternating octahedral R and tetrahedral P units.

Some hexacyanometallates (e.g., Li—SnHCFe) can adopt a layered structure that is distinct from the Prussian Blue structure and this NASICON analogue structure. Here, R atoms are still octahedrally coordinated, but P atoms are more strongly bonded to three N ends and more weakly bonded to three other N ends of the cyanide ligand. This results in an anisotropic layered structure that is different from the traditional Prussian Blue structure.

Referring to formula (I), examples of suitable A cations include: (1) H$^+$; (2) alkali metal cations (e.g., Li$^+$, Na$^+$, K$^+$, Rb$^+$, and Cs); (3) polyatomic, monovalent cations (e.g., NH$_4^+$); (4) alkaline earth metal cations (e.g., Be$^{2+}$, Mg$^{2+}$, Ca$^{2+}$, Sr$^{2+}$, and Ba$^{2+}$); and (5) polyatomic, divalent cations. In some embodiments, selection of a suitable A cation can be based on a size of the A cation relative to a size of interstitial sites and channels between the sites within the Prussian Blue crystal structure, which can be represented as a void having a diameter of about 3.5 Å.

Still referring to formula (I), examples of suitable P and R metal cations include: (1) cations of transition metals, such as top row (or row 4) transition metals (e.g., Ti, Va, Cr, Mn, Fe, Co, Ni, Cu, and Zn), row 5 transition metals (e.g., Y, Zr, Nb, Mo, Tc, Ru, Rh, Pd, Ag, and Cd), and other transition metals; (2) post-transition metals (e.g., Al, Ga, In, Sn, Tl, Pb, and Bi); (3) metalloids (e.g., B, Si, Ge, As, Sb, Te, and Po); and (4) lanthanides (e.g., La and Ce). In some embodiments, selection of a suitable P metal cation can be based on the metal cation having the capability to take on different oxidation states, modifying the band gap and electronic structure of the material, improving the chemical/structural stability of the material, or a combination of these considerations. Top row (or row 4) transition metals are examples of metals that can take on a variety of oxidation states. In some embodiments, selection of a suitable R metal cation can be based on the metal cation having the capability to take on different oxidation states, modifying the band gap and electronic structure of the material, improving the chemical stability of the hexacyanometallate group R(CN)$_6$, improving the chemical/structural stability of the material, or a combination of these considerations. Fe, Mn, Cr, and Co are examples of metals that form stable hexacyanometallate groups. Examples of suitable L anions include monovalent anions, such as polyatomic, monovalent anions (e.g., NO$^-$ and CO$^-$). In some embodiments, selection of a suitable L anion can be based on chemical stability of its bonding with the R metal cation within the group [R(CN)$_{6-w}$L$_w$].

Additional examples of suitable cations for A, P, and R can be categorized in terms of their valency and include: (1) monovalent cations (e.g., Ag$^+$, Cu$^+$, Li$^+$, Na$^+$, K$^+$, Rb$^+$, Cs$^+$, Hg$^+$, Tl$^+$, and NH$_4^+$); (2) divalent cations (e.g., Mg$^{2+}$, Ca$^{2+}$, Sn$^{2+}$, Sr$^{2+}$, Ba$^{2+}$, Zn$^{2+}$, Cd$^{2+}$, Fe$^{2+}$, Mn$^{2+}$, Cu$^{2+}$, Ni$^{2+}$, Co$^{2+}$, Pb$^{2+}$, Cr$^{2+}$, Hg$^{2+}$, Os$^{2+}$, Pd$^{2+}$, Rh$^{2+}$, Ru$^{2+}$, Ti$^{2+}$, Th$^{2+}$, and V$^{2+}$); (3) trivalent cations (e.g., Al$^{3+}$, Bi$^{3+}$, Ce$^{3+}$, Co$^{3+}$, Cr$^{3+}$, Cu$^{3+}$, Fe$^{3+}$, Ga$^{3+}$, In$^{3+}$, Ir$^{3+}$, La$^{3+}$, Mn$^{3+}$, Mo$^{3+}$, Nb$^{3+}$, Ni$^{3+}$, Os$^{3+}$, Rh$^{3+}$, Ru$^{3+}$, Sb$^{3+}$, Ta$^{3+}$, Ti$^{3+}$, V$^{3+}$, and Y$^{3+}$); and (4) tetravalent cations (e.g., Ce$^{4+}$, CO$^{4+}$, Cr$^{4+}$, Fe$^{4+}$, Ge$^{4+}$, Mn$^{4+}$, Nb$^{4+}$, Ni$^{4+}$, Pb$^{4+}$, Ru$^{4+}$, Si$^{4+}$, Sn$^{4+}$, Ta$^{4+}$, Te$^{4+}$, Ti$^{4+}$, V$^{4+}$, W$^{4+}$ and Zr$^{4+}$).

In formula (I), a mixture of different species can be included for any one or more of A, P, R, and L, such that formula (I) can be further generalized by: (1) representing A as $A_{x-a}A'_{a'}$ or $A_{x-a'-a''} \ldots A'_{a'}A''_{a''} \ldots$; (2) representing P as $P_{y-p}P'_{p'}$ or $P_{y-p'-p''} \ldots P'_{p'}P''_{p''} \ldots$; (3) representing R as $R_{1-r}R'_{r'}$ or $R_{1-r'-r''} \ldots R'_{r'}R''_{r''} \ldots$; and (4) representing L as $L_{w-l}L'_{l'}$ or $L_{w-l'-l''} \ldots L'_{l'}L''_{l''} \ldots$. In the generalized version of formula (I), the different species for A can correspond to the same chemical element with different oxidation states, different chemical elements, or a combination thereof. Likewise, the different species for each of P, R, and L can correspond to the same chemical element with different oxidation states, different chemical elements, or a combination thereof.

Referring to in formula (I), in some embodiments, A is at least one alkali metal cation, P is at least one transition metal cation, at least one post-transition metal cation, and/or at least one alkaline earth metal cation, R is at least one transition metal cation, L is an anion, x, y, and z are related based on electrical neutrality, x>0, y>0, z>0, and 0≤w≤6

In some embodiments, R comprises the cation (s) of Fe, Mn, Cr, and/or Co. In some embodiments, R comprises the cation (s) of Fe, and the hexacyanometallate is represented by $A_xP_y[Fe(CN)_6]_z$.

In some embodiments, A comprises at least one alkali metal cation, such as $Li^+$, $Na^+$, $K^+$, $Rb^+$ and/or $Cs^+$. In some embodiments, A comprises $Li^+$, wherein the $Li^+$ can diffuse through the solid-state electrolyte during the operation of the battery. In some embodiments, A comprises $Rb^+$ or $Cs^+$, wherein the presence of $Rb^+$ or $Cs^+$ can stabilize the structure and electronic/chemical properties of the hexacyanometallate, and wherein the $Rb^+$ or $Cs^+$ substantially do not diffuse through the solid-state electrolyte during the operation of the battery. In some embodiments, A comprises $Li^+$ and $Rb^+$. In some embodiments, A comprises $Li^+$ and $Cs^+$.

In some embodiments, P comprises the cation (s) of at least one transition metal. In some embodiments, P comprises the cation(s) of at least one row-4 transition metal. In some embodiments, P comprises the cation(s) of at least one of Mn, Fe, Co, Ni, Cu, and Zn.

In some embodiments, P comprises the cation (s) of at least two different transition metals. In some embodiments, P comprises the cation(s) of at least two different row-4 transition metals.

In some embodiments, P comprises the cation (s) of at least one post-transition metal. In some embodiments, P comprises the cation(s) of at least one of Al, Ga, In, and Sn.

In some embodiments, P comprises the cation (s) of at least one alkaline earth metal. In some embodiments, P comprises the cation(s) of at least one of Mg, Ca, Sr, and Ba. In some embodiments, P comprises the cation (s) of at least one alkaline earth metal, and A comprises $Rb^+$ or $Cs^+$.

In some embodiments, P comprises the cation(s) of at least one metal selected from Fe, Cr, Mn, Co, Ni, Cu, Zn, Sn, Mg, Ca, Sr, and Ba. In some embodiments, P comprises the cation(s) of at least two metals selected from Fe, Cr, Mn, Co, Ni, Cu, Zn, Sn, Mg, Ca, Sr, and Ba.

In some embodiments, P is octahedrally coordinated to the cyanide ligands. In some embodiments, P is tetrahedrally coordinated to the cyanide ligands. In some embodiments, P is partially tetrahedrally coordinated to the cyanide ligands and partially octahedrally coordinated to the cyanide ligands. In some embodiments, the hexacyanometallate has a rhombohedral structure.

In some embodiments, the hexacyanometallate has a lithium-ion conductivity of about $10^{-5}$ S/cm or more, or about $10^{-4}$ S/cm or more, or about $10^{-3}$ S/cm or more, or about $10^{-2}$ S/cm or more, or up to about $10^{-1}$ S/cm or more, or up to about 1 S/cm or more.

In some embodiments, the hexacyanometallate has an electronic conductivity of about $10^{-6}$ S/cm or less, or about $10^{-7}$ S/cm or less, or about $10^{-8}$ S/cm or less, or about $10^{-9}$ S/cm or less, or down to about $10^{-10}$ S/cm or less, or down to about $10^{-11}$ S/cm or less.

In some embodiments, the hexacyanometallate maintains its electronic conductivity values when a voltage of about 1 V or more, or about 2 V or more, or about 3 V or more, or about 4 V or more, or about 5 V or more is applied across it.

In some embodiments, the hexacyanometallate is electrochemically and/or chemically stable when cycled in contact with lithium metal or a metal oxide cathode at up to about 0 V vs $Li/Li^+$. In some embodiments, the hexacyanometallate is electrochemically and/or chemically stable when cycled in contact with lithium metal or a metal oxide cathode at up to about 1 V vs $Li/Li^+$. In some embodiments, the hexacyanometallate is electrochemically and/or chemically stable when cycled in contact with lithium metal or a metal oxide cathode at up to about 2 V vs $Li/Li^+$. In some embodiments, the hexacyanometallate is electrochemically and/or chemically stable when cycled in contact with lithium metal or a metal oxide cathode at up to about 3 V vs $Li/Li^+$. In some embodiments, the hexacyanometallate is electrochemically and/or chemically stable when cycled in contact with lithium metal or a metal oxide cathode at up to about 4 V vs $Li/Li^+$. In some embodiments, the hexacyanometallate is electrochemically and/or chemically stable when cycled in contact with lithium metal or a metal oxide cathode at up to about 5 V vs $Li/Li^+$. In some embodiments, the hexacyanometallate is electrochemically and/or chemically stable when cycled in contact with lithium metal beyond about 5 V vs $Li/Li^+$.

In some embodiments, the hexacyanometallate is substantially electrochemically inactive during operation of the battery, with the valency of both P and R units remaining unchanged within +/−about 5% compared to their initial valency as-synthesized. In some embodiments, the hexacyanometallate is substantially electrochemically inactive during operation of the battery, with the valency of both P and R units remaining unchanged within +/−about 1% compared to their initial valency as-synthesized. In some embodiments, the hexacyanometallate is substantially electrochemically inactive during operation of the battery, with the valency of both P and R units remaining unchanged within +/−about 0.1% compared to their initial valency as-synthesized. In some embodiments, there is substantially no redox reaction with the hexacyanometallate during operation of the battery.

Additional embodiments relate to a solid-state lithium-ion battery, comprising a cathode, a lithium metal anode, and a solid-state electrolyte disposed between the cathode and the lithium metal anode, wherein the solid-state electrolyte comprises at least about 30%, or at least about 40%, or at least about 50 wt. %, or at least about 60 wt. %, or at least about 70 wt. %, or at least about 80 wt. %, or at least about 90 wt. %, or at least about 95 wt. % of a hexacyanometallate. In some embodiments, the hexacyanometallate has a Prussian Blue crystal structure through which lithium ions travel during operation of the battery. In some embodiments, the hexacyanometallate has a non-Prussian Blue crystal structure through which lithium ions travel during operation of the battery.

Applications

The solid-state lithium-ion battery described herein can be used in a variety of applications that involve high power and energy densities. For example, the solid-state lithium-ion battery described herein can be used in electrical cars, aircrafts, and drones. The solid-state lithium-ion battery described herein can also be used in portable electronics and grid-scale energy storage devices.

In addition to lithium-ion batteries, the solid-state electrolyte described herein, which is based on hexacyanometallate, can also be used in other metal ion batteries (e.g., $Na^+$ or $K^+$), fuel cells, and ion conductive membranes.

WORKING EXAMPLES

Example 1

Hexacyanometallate synthesis. Unless otherwise stated, all electrolyte materials were prepared by dropwise addition of a 50 mL aqueous solution of 128 mM metal chloride salt (e.g. $ZnCl_2$, $MnCl_2$, etc.) into a 100 mL aqueous solution of 46.7 mM of sodium ferrocyanide ($Na_4Fe(CN)_6$) and 1.17 M LiCl under vigorous stirring. Materials with $Rb^+$ or $Cs^+$ in the structure were synthesized in the presence of dissolved RbCl or CsCl instead of LiCl. The materials were centrifuged and washed with water three times, then dried in vacuum at 100° C. overnight.

Cobalt-Manganese hexacyanoferrates synthesis. Preparation of nanoparticulate cobalt-manganese hexacyanoferrates was performed as follows. Briefly, equal volumes of 40 mM $Co(NO_3)_2$ (Alfa Aesar) and 20 mM $K_4Fe(CN)_6$ (Sigma Aldrich) were combined by simultaneous, dropwise addition into water under vigorous stirring in a 5M NaCl solution. The Co—MnHCFe was filtered, washed with water, and dried in vacuum at 100° C. overnight.

Copper hexacyanoferrates synthesis. Preparation of nanoparticulate copper hexacyanoferrate was performed as follows. Briefly, equal volumes of 40 mM $Cu(NO_3)_2$ (Alfa Aesar) and 20 mM $K_3Fe(CN)_6$ (Sigma Aldrich) were combined by simultaneous, dropwise addition into water under vigorous stirring. An excess of $Cu^{+2}$ is desired for precipitation and particle growth. All of the $Fe(CN)_6$ is oxidized initially, but fully charged CuHCFe has a potential high enough to oxidize water. Thus, spontaneous partial reduction of CuHCFe occurs, resulting in a fractional initial charge state, typically between 50% and 80% of total capacity. Five minutes after complete addition of the CuHCFe precursors, 0.1 M $Na_2S_2O_3$ was added until a desired molar ratio of $FeIII(CN)_6^{-3}$ to $S_2O_3^{-2}$ was reached. The color of CuHCF changed from a dingy yellow to a deep claret upon addition of $Na_2S_2O_3$, indicating a successful reduction. The CuHCFe was filtered, washed with water, and dried in vacuum at room temperature.

Pellet preparation. Powders of hexacyanometallate materials were ground together with approximately 5% w/w polyvinylidene fluoride in a mortar and pestle. The powders were dried under vacuum at 80° C. and pressed in either a 5 mm or 13 mm stainless steel pellet die at approximately 700 MPa.

Electrochemical impedance spectroscopy (EIS). EIS measurements with 0 V bias and a 10 mV amplitude signal were taken at frequencies between 1 MHz and 100 mHz. Solid pellet samples were coated with silver paste or sputtered with gold on both sides and sandwiched between two stainless steel electrodes for each measurement. For the temperature-dependent measurements, samples were allowed to equilibrate thermally for approximately 45 minutes before the beginning of each measurement.

Results

MnHCFe, CoHCFe, and the 25% Mn—, 50% Mn—, and 75% Mn—CoHCFe hybrids were synthesized in their reduced Na-containing form ($Mn^{II}$, $Co^{II}$—N≡C—$Fe^{II}$) and with a low vacancy content by adapting a method for electrodeposited thin films. The chemical composition of the as-synthesized powders (Table 1) was determined by inductively coupled plasma mass spectrometry (ICP-MS), while the water content was analyzed by thermogravimetric analysis (TGA). All the materials have a $[FeCN)_6]$ vacancy content ranging from 21 to 8%, which is lower than that of hexacyanometallates synthesized with a co-precipitation method (30-40%). Pure CoHCFe and MnHCFe show a higher vacancy content compared to the hybrids. This might be due to the different crystallization kinetics associated with their different solubility products. The Mn/Co ratio of the precursors employed in the synthesis is retained in the final product.

TABLE 1

Figure 2A:
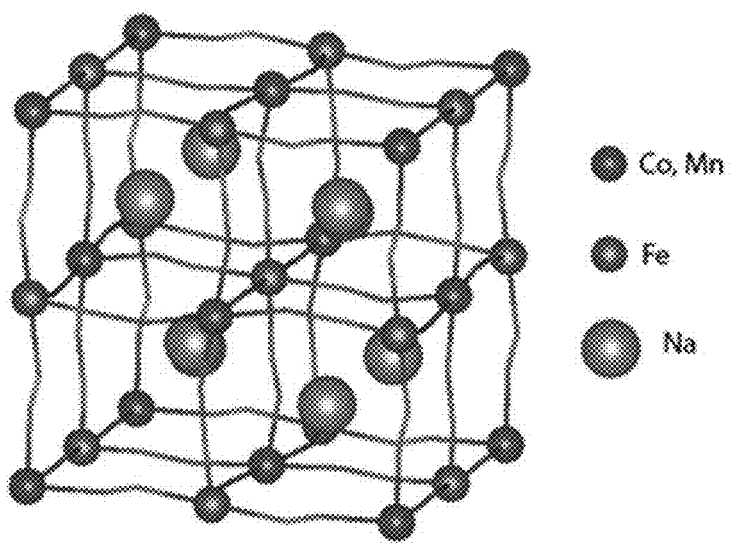
FIGS. 2A-2C: Physicochemical characterization of the Mn—CoHCFe hybrids. The as-synthesized powders have (FIG. 2A) a rhombohedral lattice with the R-3m space group. The space group is confirmed by (FIG. 2B) Le Bail fitting of the synchrotron X-ray powder diffractograms. Transmission electron microscopy (TEM) images (FIG. 2C) show that the Co-containing particles are made of smaller crystallites that are not seen in MnHCFe. Energy-dispersive X-ray spectroscopy (EDS) mapping further confirms the uniform distribution of Co, Mn, and Fe in each particle characteristic of a solid solution.

Physical characterization of the as-synthesized Co—MnHCFe powders. The powders are produced in their reduced, discharged state ($Co^{II}$, $Mn^{II}$—N≡C—$Fe^{II}$). Le Bail fitting of the synchrotron X-ray diffractograms reported in FIGS. 2A-2C show that the as-synthesized powders have a rhombohedral lattice (hexagonal setting shown below) with space group R-3m ($a = b \neq c$, $\alpha = \beta = 90°$, $\gamma = 120°$).

| Material | Chemical Composition (ICP-MS) | a = b (Å) | c (Å) | a/√2 (Å) | c/√3 (Å) | Crystallite size (nm) |
|---|---|---|---|---|---|---|
| CoHCFe | $Na_{1.54}Co[Fe(CN)_6]_{0.86}\bullet_{0.14}\bullet 2.16H_2O$ | 14.852(1) | 17.504(2) | 10.502 | 10.106 | 41 |
| 25% Mn—CoHCFe | $Na_{1.76}Mn_{0.26}Co_{0.74}[Fe(CN)_6]_{0.92}\bullet_{0.08}\bullet 2.32H_2O$ | 14.915(2) | 17.627(4) | 10.546 | 10.177 | 41 |
| 50% Mn—CoHCFe | $Na_{1.70}Mn_{0.50}Co_{0.50}[Fe(CN)_6]_{0.92}\bullet_{0.08}\bullet 2.15H_2O$ | 14.974(2) | 17.713(3) | 10.588 | 10.227 | 40 |
| 75% Mn—CoHCFe | $Na_{1.53}Mn_{0.75}Co_{0.25}[Fe(CN)_6]_{0.90}\bullet_{0.10}\bullet 2.09H_2O$ | 15.021(1) | 17.815(3) | 10.621 | 10.285 | 47 |
| MnHCFe | $Na_{1.33}Mn[Fe(CN)_6]_{0.79}\bullet_{0.21}\bullet 1.88H_2O$ | 15.052(1) | 17.933(2) | 10.643 | 10.354 | 81 |

Figure 2B:
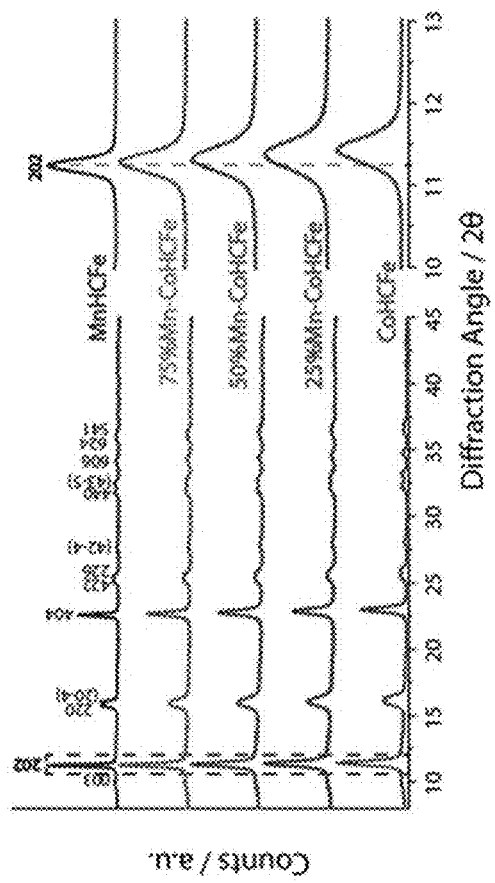
Figure 2C:
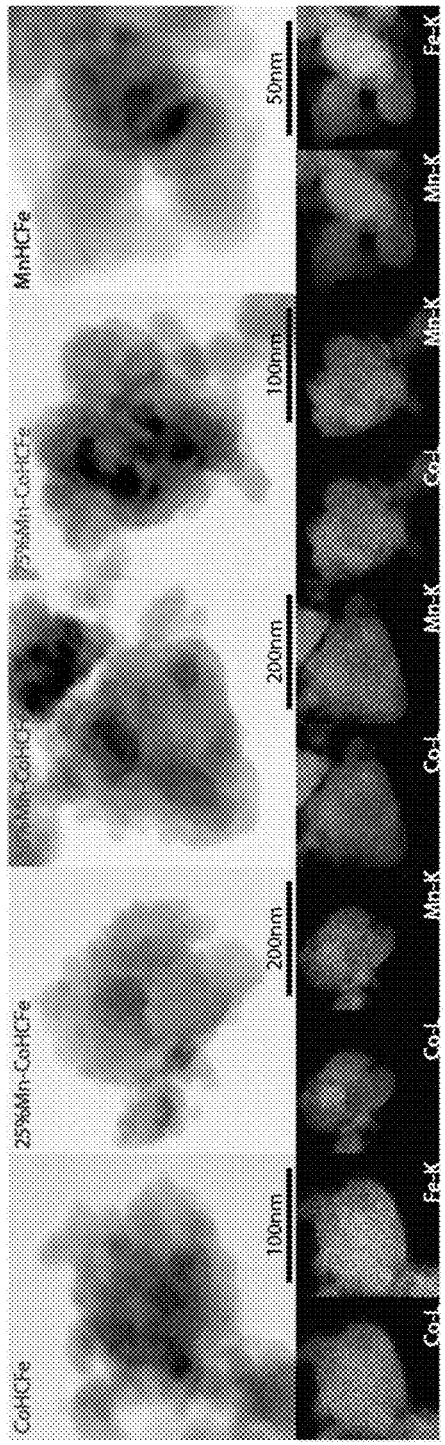

The synthesized powders all take on a slightly distorted rhombohedral form (R-3m space group, FIG. 2A) of the typical cubic structure observed in hexacyanometallates, as confirmed by Le Bail fitting of synchrotron X-ray diffraction (XRD) data in FIG. 2B. The rhombohedral structure is the result of a distortion of the characteristic, face-centered cubic crystal structure of hexacyanometallates along the body diagonal triggered by the asymmetric electrostatic potential induced within the cubic framework.

Figure 3A:
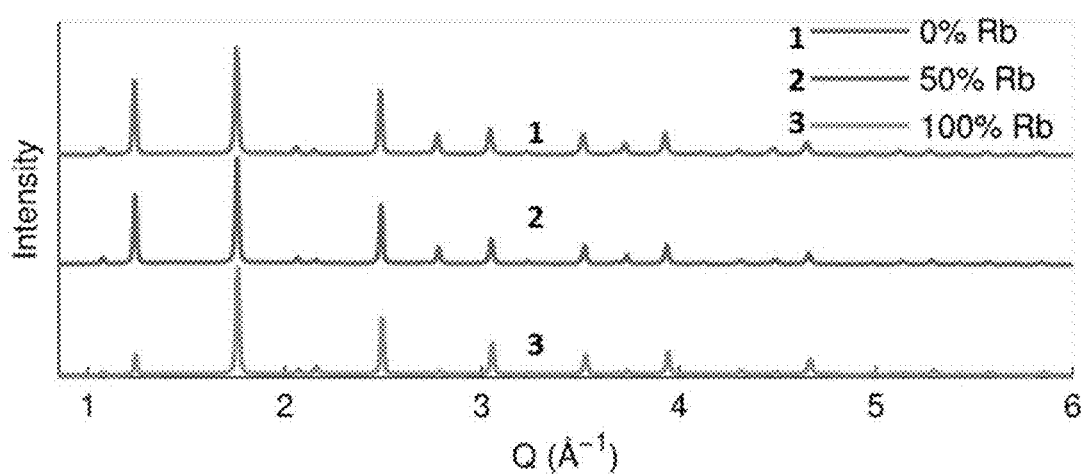
FIGS. 3A-3B: X-ray diffraction of CuHCFe at different states of charge.
Figure 3B:
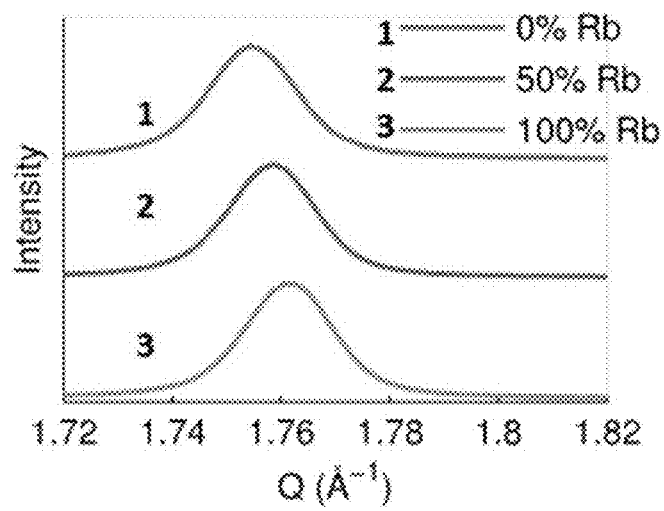

Copper hexacyanoferrate (III) was synthesized by a co-precipitation method. Fully reduced copper hexacyanoferrate (II) and 50% reduced copper hexacyanoferrate were synthesized by reduction with sodium thiosulfate. By reducing the C coordinated $Fe^{II}$ to $Fe^{II}$, the material retains its open framework cubic crystal structure and as alkali ions are inserted in the A sites (FIGS. 3A-3B). A linear variation of the lattice parameter can be observed, which was attributed to the shortening of the C—Fe bond.

Figures 4A, 4B:
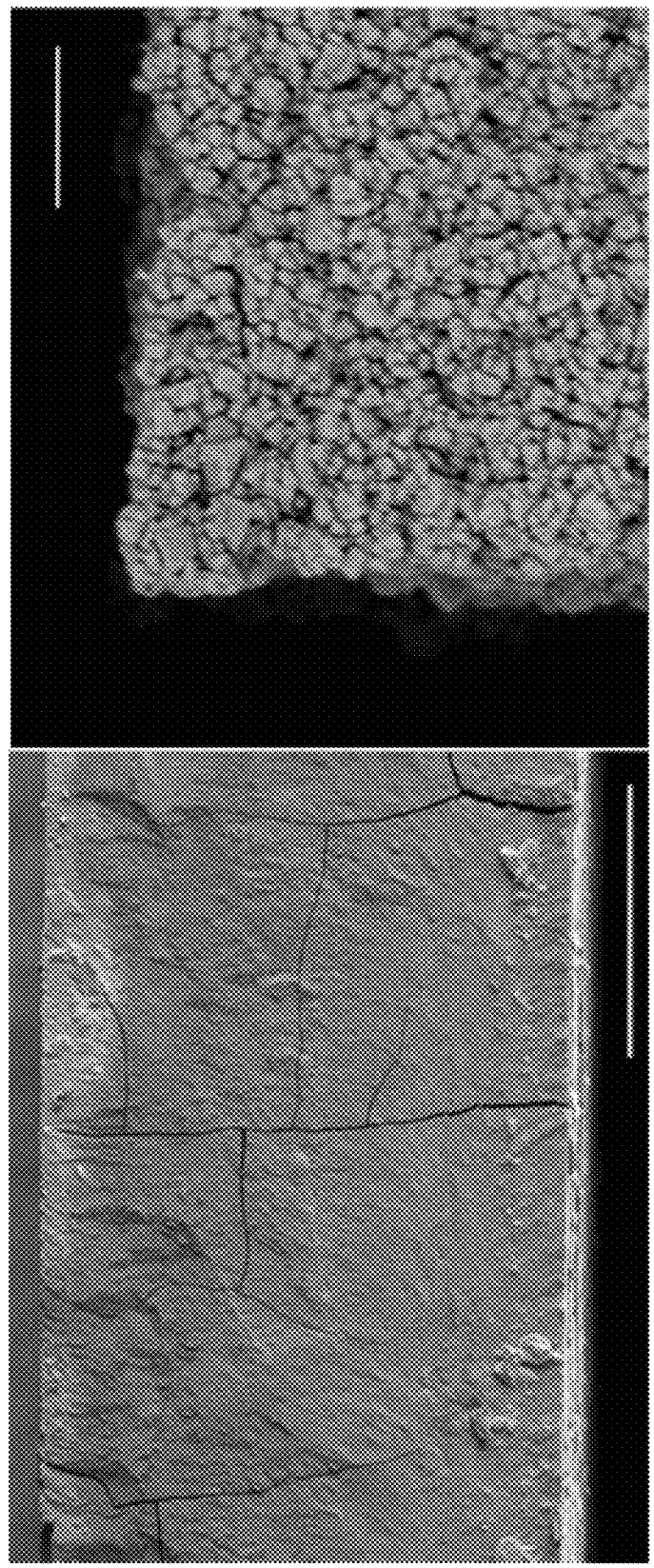
FIGS. 4A-4B: Scanning electron microscopy (SEM) of pressed pellet sample. The SEM image of FIG. 4A (lower-right scale bar=200 μm) shows cracking of a 75% MnCoHCFe pellet that is typical of the pressed pellet samples that were electrochemically characterized. The SEM image of FIG. 4B (upper-right scale bar=500 nm) shows a close-up view of the individual grains in the pellet.

Solid-state samples were prepared for the bulk impedance measurements. Scanning electron micrographs (SEM) of the pellet cross-section in FIGS. 4A-4B show the typical quality of the samples tested. Large cracks with widths greater than 1 μm (FIG. 4A) run throughout some pellets because of their mechanical instability in the absence of sintering. These cracks hinder the bulk movement of ions through the sample. As a result, some of the bulk resistance measurements (which are normalized by the geometric area of the pellet) are likely higher than the actual bulk resistances expected in densified uncracked samples. A close-up view of the pellet (FIG. 4B) shows the very small grain size (below 100 nm) of the material. This produces many grain boundaries throughout the pellet that cause the large grain boundary resistances measured in these experiments. The dark area around the edge of the image represents one of the large cracks that impede bulk ionic transfer. Improvements in sample processing and synthesis can reduce bulk ionic resistances by eliminating pellet cracking and reducing the number of grain boundaries.

Electrochemical impedance spectroscopy (EIS) was used to characterize the bulk ionic and electronic resistances of a variety of hexacyanometallates. Because some of these bulk samples exhibit cracking, the magnitude of the resistance measurement are likely higher than the actual resistance in the bulk.

Figure 5A:
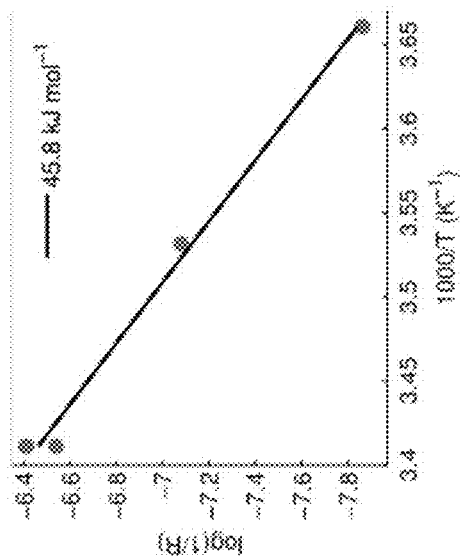
FIGS. 5A-5D: Impedance and activation energy of Na—MnCoHCFe(II) hybrids.
Figure 5B:
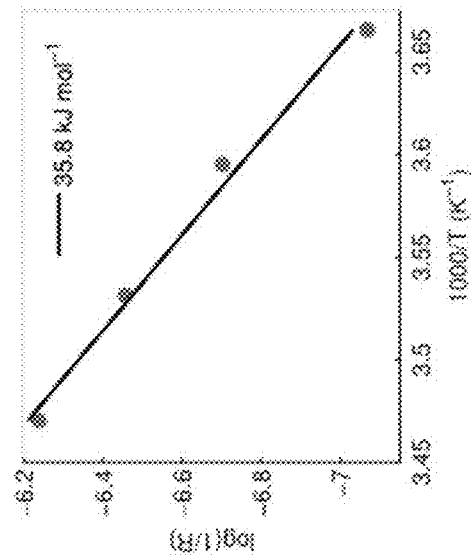
Figure 5C:
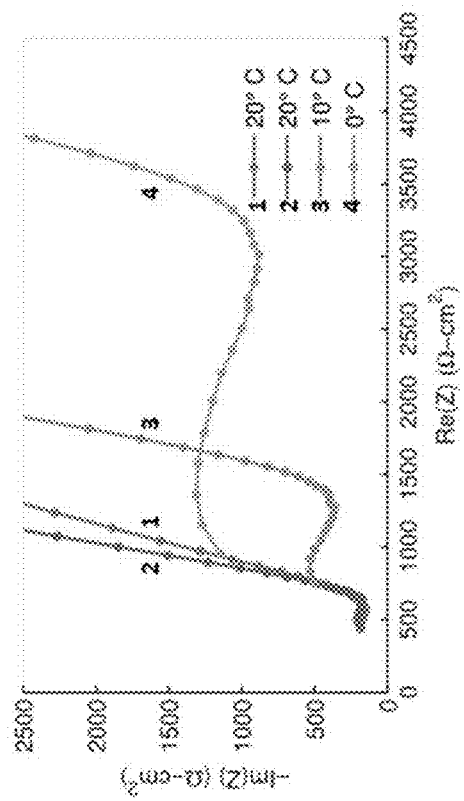

FIGS. 5A and 5C show Nyquist plots with arcs (highest-frequency ones near the origin) corresponding to the bulk ionic resistance for Na—MnCoHCFe(II) hybrid materials with 75% and 50% Mn, respectively. Even with cracks running throughout the sample, a bulk sodium-ion conductivity greater than $10^{-4}$ S cm$^{-1}$ was observed at 15° C. in the case of the Na—MnCoHCFe hybrid with 50% Mn. It can be reasonably expected that sodium-ion conductivity at room temperature in a fully densified sample is likely higher than this value. Lithium-ion conductivity is likely even higher because of the smaller size of the ion, which typically allows for faster diffusion. The tail at low frequencies corresponds to a low electronic conductivity, which indicates a high ionic transference number.

Figure 5D:
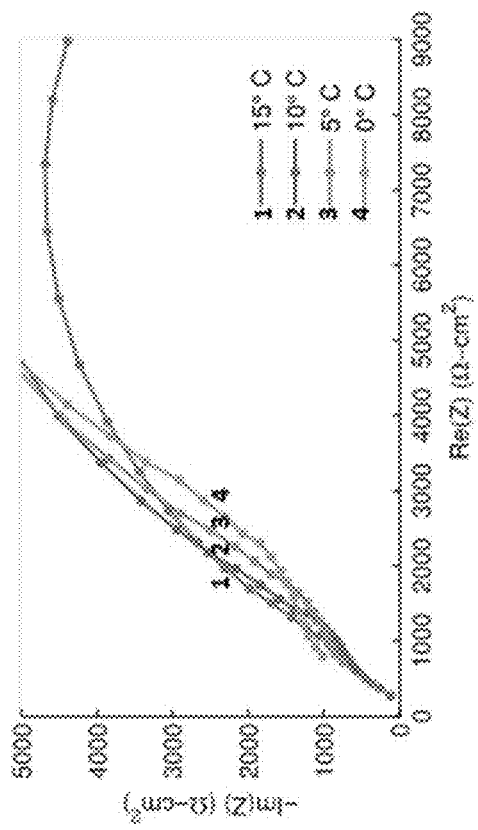

The bulk ionic resistance, which is equal to the diameter of the arc, follows an exponential Arrhenius temperature dependence, as shown in FIGS. 5B and 5D. Linear fits of the data in the Arrhenius plots can be used to extract the activation energies corresponding to bulk sodium-ion diffusion in these materials (45.8 and 35.8 kJ mol$^{-1}$ for the 75% and 50% Mn materials, respectively). This demonstrates one way (doping transition-metal ions) to modify the properties of hexacyanometallates relevant to a solid electrolyte.

Figure 6A:
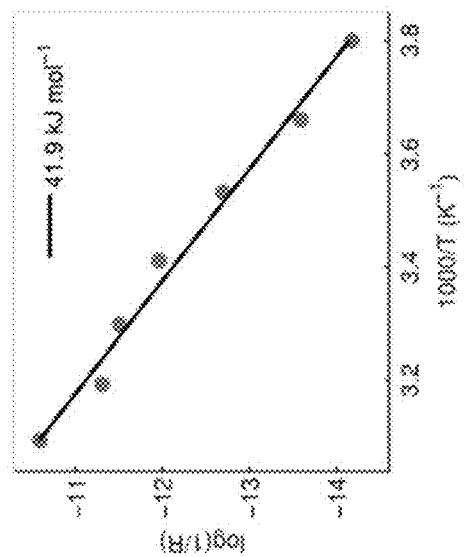
FIGS. 6A-6D: Impedance and activation energy of oxidized CuHCFe(III) and 50% reduced Na—CuHCFe(III/II).
Figure 6B:
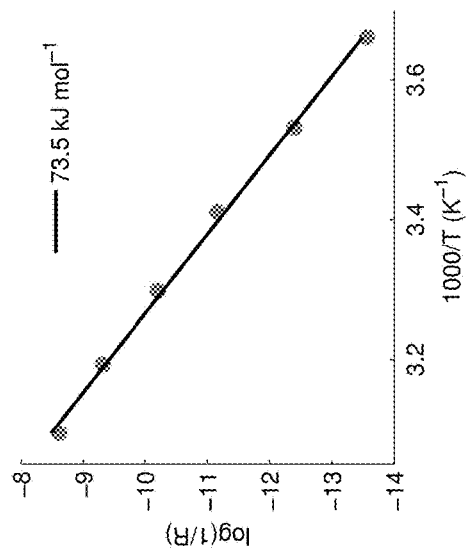
Figure 6C:
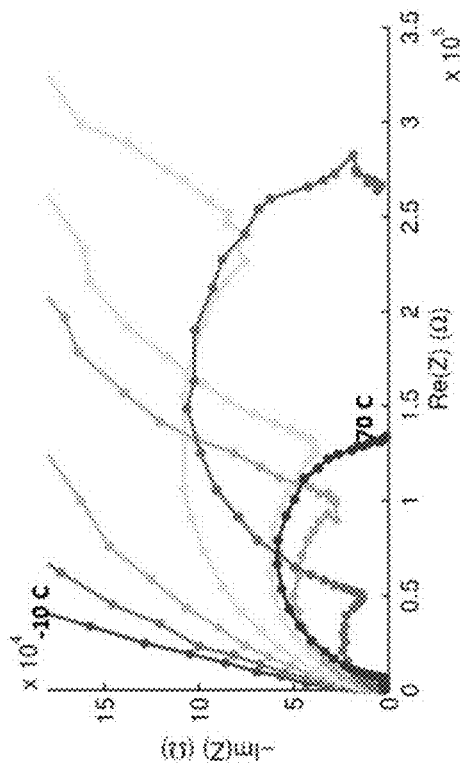

FIGS. 6A and 6C show Nyquist plots with arcs corresponding to the total ionic (bulk+grain boundary) and electronic resistances for oxidized CuHCFe(III) and 50% reduced Na—CuHCFe(II/III) materials, respectively. These samples also have cracks within the bulk, so it can be reasonably expected that the actual ionic resistance is likely lower than that shown here. The lack of a tail at low frequencies indicates steady-state electronic conduction. This shows that changing the transition metal ions in the structure can affect both the ionic and electronic properties of the material.

Figure 6D:
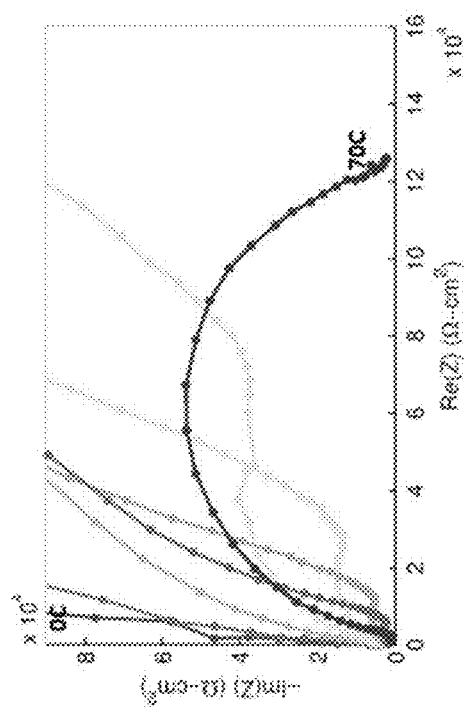

The total ionic resistance, which can be calculated from the sizes of the arcs, follows an exponential Arrhenius temperature dependence, as shown in FIGS. 6B and 6D. Linear fits of the data in the Arrhenius plots can be used to extract the activation energies corresponding to sodium-ion diffusion in these materials (41.9 and 73.5 kJ mol$^{-1}$ for the fully oxidized and 50% reduced materials, respectively). This demonstrates another way (changing oxidation state by chemically inserting ions, which also changes the ion concentration in the structure) to modify the properties of hexacyanometallates relevant to a solid electrolyte. Moreover, the differences between this data and the data for the MnCoHCFe system shows that both ionic and electronic properties can be tuned by changing the transition metal ions in the structure.

Figure 7:
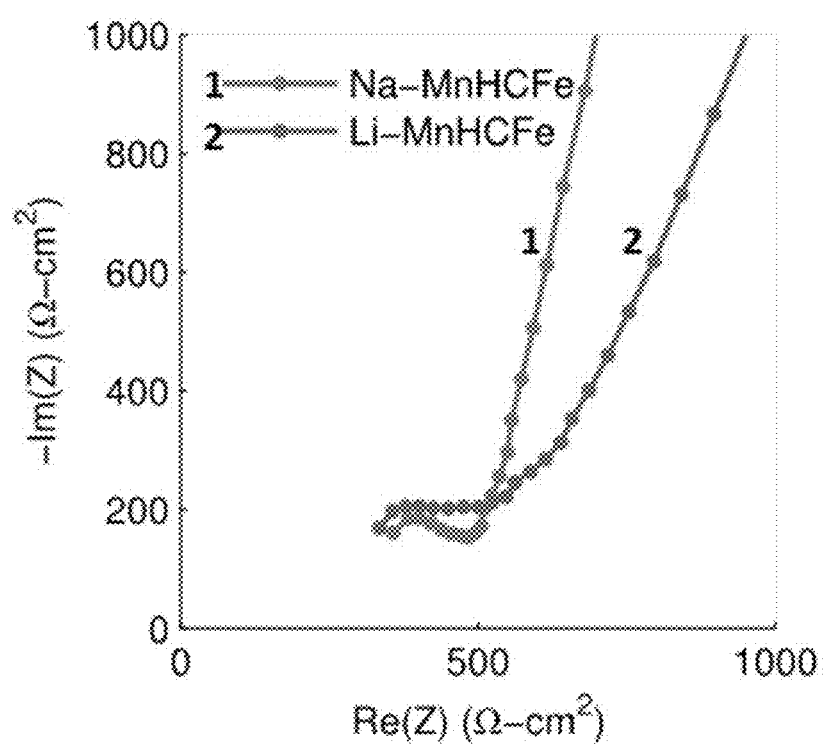
FIG. 7: Impedance of Li—MnHCFe(II) and Na—MnHCFe(II). The Nyquist plot shows arcs corresponding to the lithium- and sodium-ion conductivities in MnHCFe(II) at room temperature. The size of the arcs corresponds to an ionic conductivity greater than $10^{-4}$ S $cm^{-1}$.

FIG. 7 shows a Nyquist plot with high-frequency arcs corresponding to the bulk ionic resistances for Na—MnHCFe(II) and Li—MnHCFe(II) at room temperature. This shows that both Na and Li ions can diffuse through the structure rapidly, with the size of both arcs corresponding to a bulk ionic conductivity of approximately $2\times10^{-4}$ S cm$^{-1}$. Macroscopic cracks in these pellets would reduce the measured conductivity, so the actual bulk ionic conductivity is likely higher. The tail at low frequencies corresponds to a low electronic conductivity, which indicates a high ionic transference number.

Figure 8B:
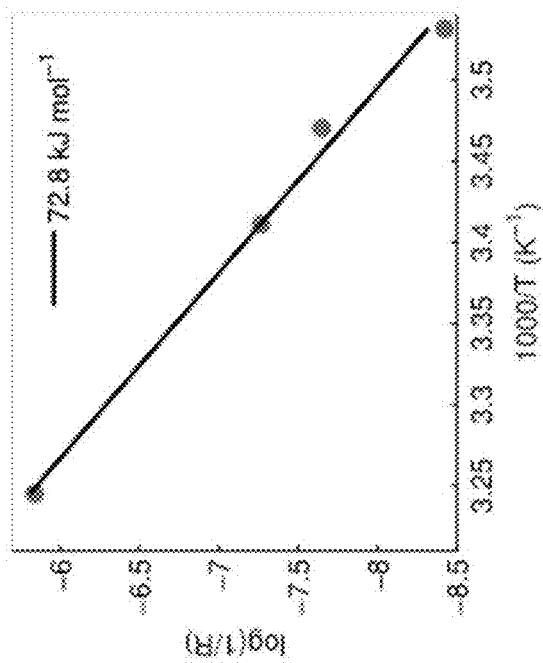
FIGS. 8A-8B: Impedance and activation energy of Li—MnHCFe(II). The Nyquist plot (FIG. 8A) shows arcs associated with the ionic resistance, while the Arrhenius plot (FIG. 8B) show the activation energy associated with the Li-ion conduction process.
Figure 8A:
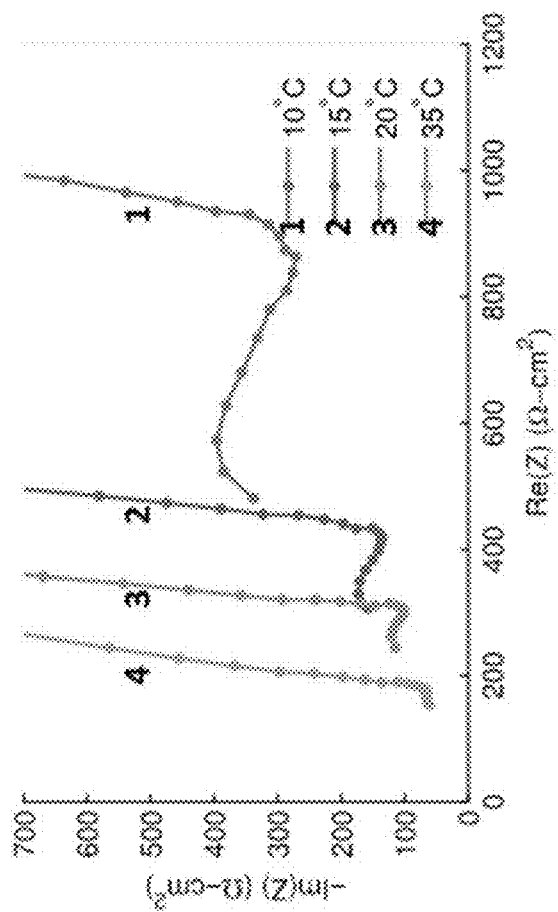

FIG. 8A shows a Nyquist plot with arcs corresponding to the bulk ionic resistance for Li—MnHCFe(II). The small size of the arc corresponds to a room-temperature bulk ionic conductivity greater than $10^{-4}$ S cm$^{-1}$. The bulk ionic resistance, which is equal to the diameter of the arc, follows an exponential Arrhenius temperature dependence, as shown in FIG. 8B. Linear fits of the data in the Arrhenius plots can be used to extract the activation energies corresponding to bulk lithium-ion diffusion in this materials (72.8 kJ mol$^{-1}$). This further demonstrates the diffusion of different types of ions (Na and Li) through the structure of hexacyanometallates. The tail at low frequencies corresponds to a low electronic conductivity, which indicates a high ionic transference number.

In conclusion, hexacyanometallates share an unusual open-framework crystal structure with open channels that allow for the rapid diffusion of ions. This material system also offers many parameters that can be varied to modify the ionic, electronic, and structural properties of the material for a solid electrolyte application. The tunable parameters include, for example, the type of transition metal ions within the structure, the oxidation states of the transition metal ions, the type of insertion ion within the structure, and the concentration of insertion ions. In addition, other parameters can also be used to tune ionic and electronic properties, including the vacancy concentration of transition metal ions, the water content inside the structure, and the lattice parameter of the unit cell.

All the samples have been prepared by cold pressing with a binder concentration under 10%, and the quality of such proof-of-concept embodiments is limited by both the macroscopic cracks that run through the samples and by the significant grain boundaries between individual particles. Even given these experimental conditions of this example, hexacyanometallates have already demonstrated bulk ionic conductivities of both lithium and sodium greater than $10^{-4}$ S cm$^{-1}$ and with negligible electronic conductivity. These properties demonstrated that hexacyanometallates are suitable as solid electrolytes in lithium-ion batteries.

Example 2

Figure 9:
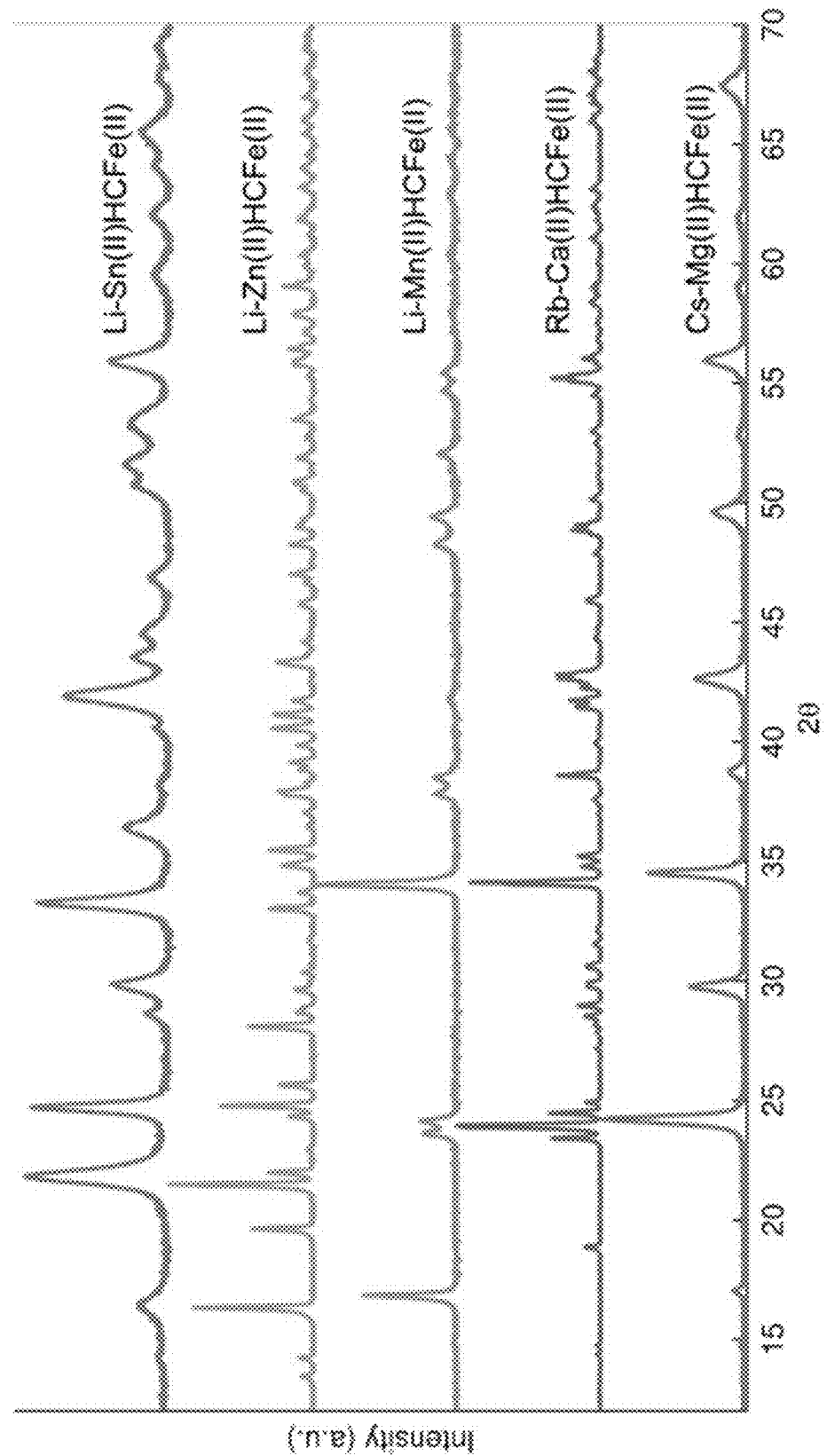
FIG. 9: X-ray diffractograms of solid electrolyte candidates. Changing either the insertion ion or the framework metal ion can affect the structural arrangement of atoms.
Figure 10:
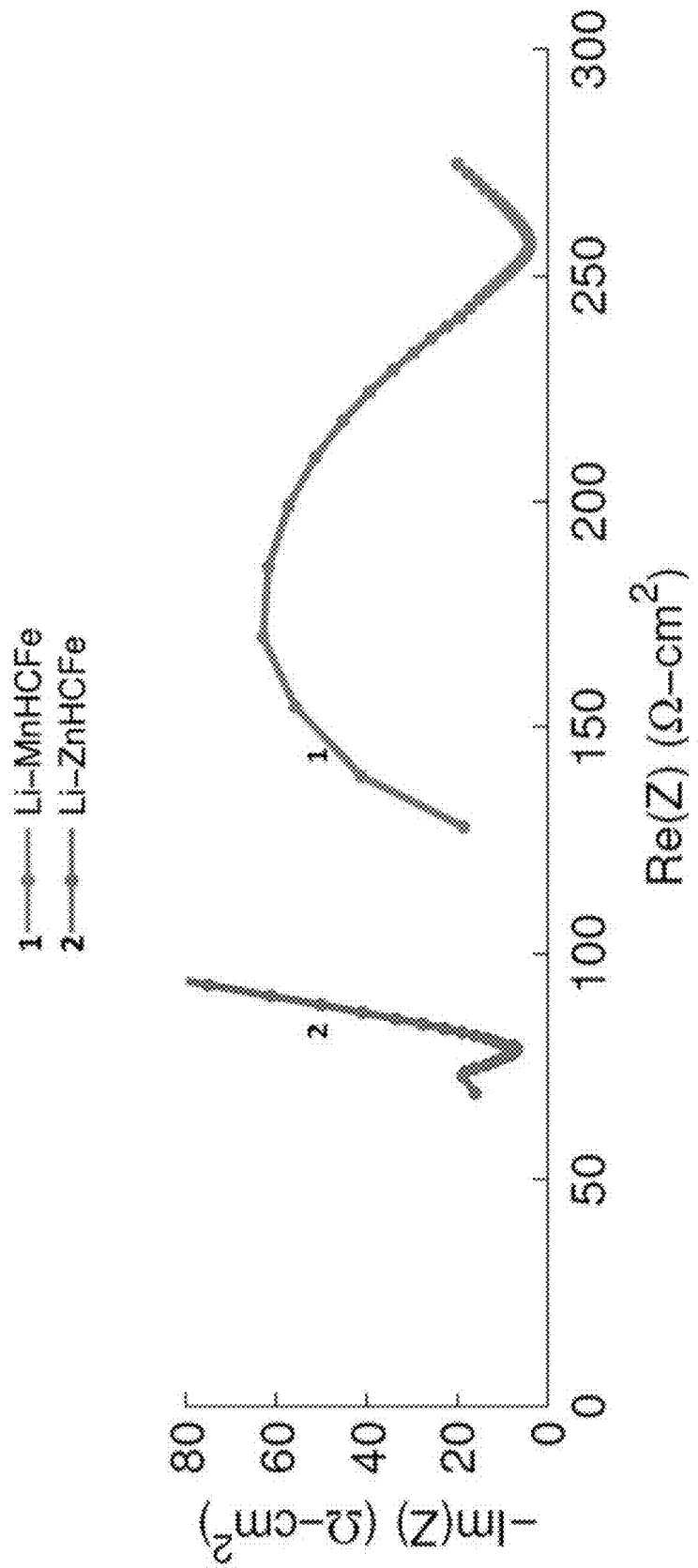
FIG. 10: Ionic conductivity in solid electrolyte candidates with different crystal structures. High lithium-ion conductivity and negligible electronic conductivity have been demonstrated for both Li—ZnHCFe(II) and Li—MnHCFe(II). Li—ZnHCFe(II) exhibits a total lithium-ion conductivity of approximately $10^{-3}$ S $cm^{-1}$.

A wide variety of solid electrolyte candidates with cyanide ligands joining cations can be synthesized by adapting the basic Prussian Blue co-precipitation method. These materials can have different ionic conductivity, electronic properties, crystal structure, chemical stability, and other properties. These properties can be modified by tuning the structure of the material. FIG. 9 shows the different crystal structures of a number of solid electrolyte candidates with the basic framework composed of cyanide linkages joining together cations.

Not all of these materials are directly analogous to the traditional Prussian Blue structure. The main distinguishing feature is whether the N-coordinated ion (the non-Fe one) is octahedrally (Prussian Blue analogue) or tetrahedrally coordinated to the cyanide ligands. In FIG. 9, Cs—MgHCFe, Rb—CaHCFe, and Li—MnHCFe are all distorted variants of the Prussian Blue structure, and they all have framework ions octahedrally coordinated to cyanide ligands. On the other hand, Li—ZnHCFe and Li—SnHCFe are partially or completely composed of framework ions tetrahedrally coordinated to cyanide ligands.

Most transition metal salts readily precipitate when combined in solution with a ferri/ferrocyanide salt because of the strong covalent interaction between the framework ions and the cyanide ligands. This is not the case when the transition metal salt is replaced with an alkaline earth salt, such as a Mg, Ca, Sr, or Ba salt. These materials typically precipitate when there is a sufficiently large alkali earth ion (such as Rb or Cs) in the solution to stabilize the structure. Two successful examples of these materials are shown in FIG. 9. Previously it was not successfully to synthesize these alkaline earth hexacyanometallates with lithium ions in the structure. Introducing low concentrations of larger alkali ions (such as Rb or Cs) in solution during synthesis can help to stabilize the structure while allowing some lithium ions to remain in the structure as well, thus making these alkaline earth hexacyanometallates suitable as solid electrolytes.

Li—MnHCFe and Li—ZnHCFe have different crystal structures, as demonstrated by their XRD patterns in FIG. 9. Li—MnHCFe has an almost cubic hexacyanometallate structure with some slight distortions. On the other hand, Li—ZnHCFe has a NASICON-type structure where Zn(II) ions are tetrahedrally coordinated to $Fe(CN)_6$ units. Despite their different crystal structures, both materials demonstrate high solid-state lithium-ion conductivity (around $2-11\times10^{-4}$ S/cm) and negligible electronic conductivity. This shows the suitability of these open-framework structures, composed of cyanide ligands and cations, as solid electrolytes. This is evident regardless of whether the material has a strict hexacyanometallate structure or not because the performance is provided by the open nature of the cyanide ligand framework.

Figure 11A:
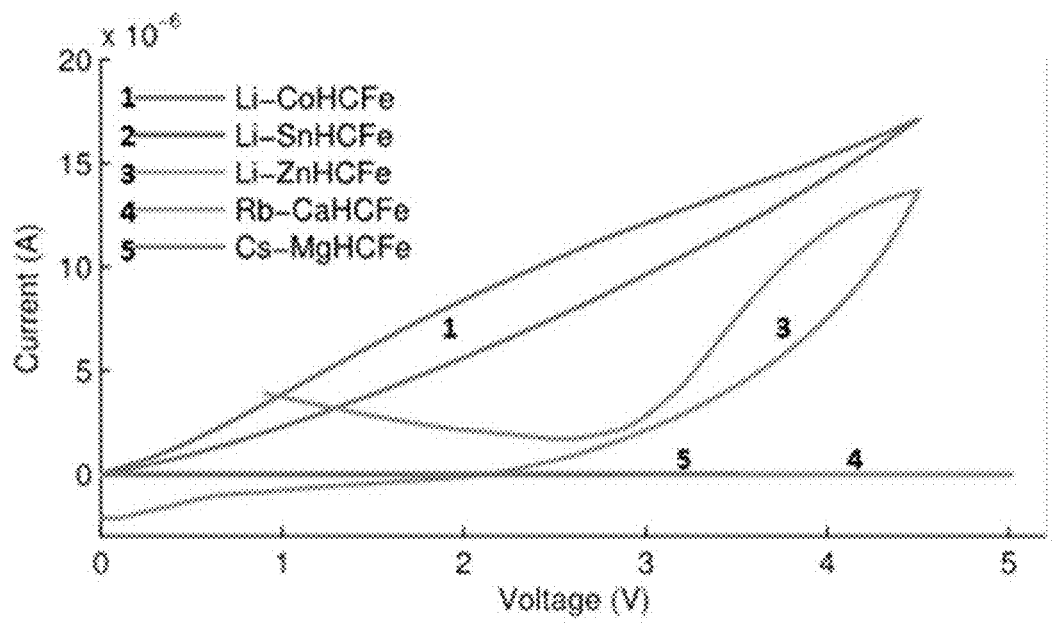
FIGS. 11A-11B: Electronic conductivity of solid electrolyte candidates.
Figure 11B:
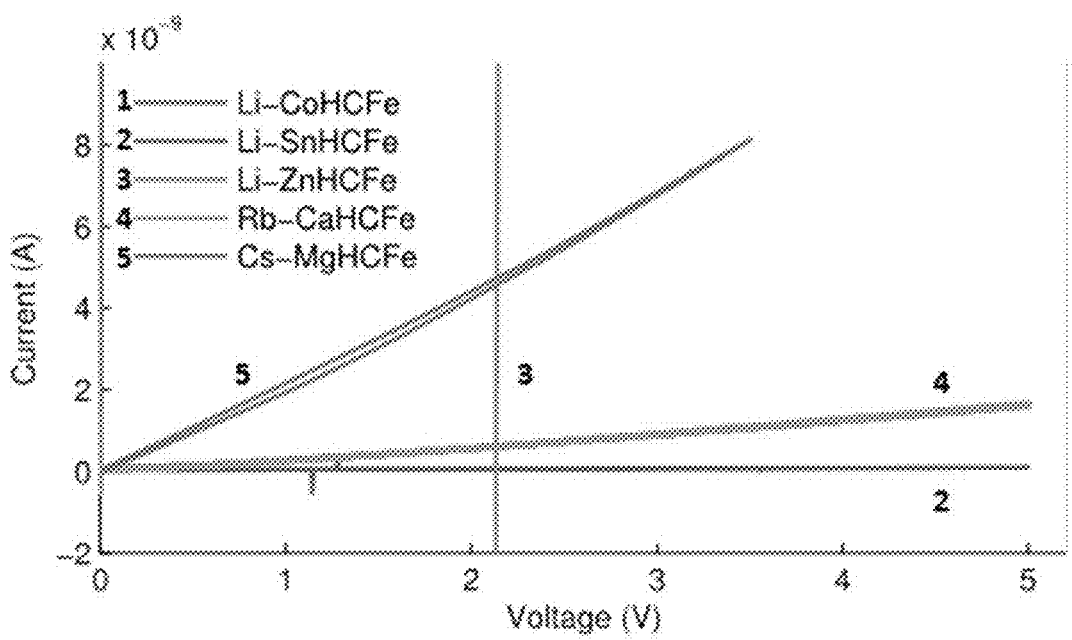

Negligible electronic conductivity is another metric for a solid electrolyte. This can be determined either through EIS or by running a slow CV scan of the material between two ionically blocking electrodes. Any current that passes through corresponds to electronic conduction. CV scans of several solid electrolyte candidates are shown in FIGS. 11A-11B.

The materials tested demonstrate both ohmic and non-ohmic behavior as well as electronic conductivity that varies by several orders of magnitude. The electronic behavior is strongly dependent on the electronic structure and spin state of the framework ions. Li—CoHCFe and Li—ZnHCFe both exhibit noticeable electronic conduction, depending on the voltage applied across the pellet, while Cs—MgHCFe, Rb—CaHCFe, and Li—SnHCFe are almost entirely electronically insulating. Changing the framework ions allows for fine control over the electronic properties of the material.

Figure 12A:
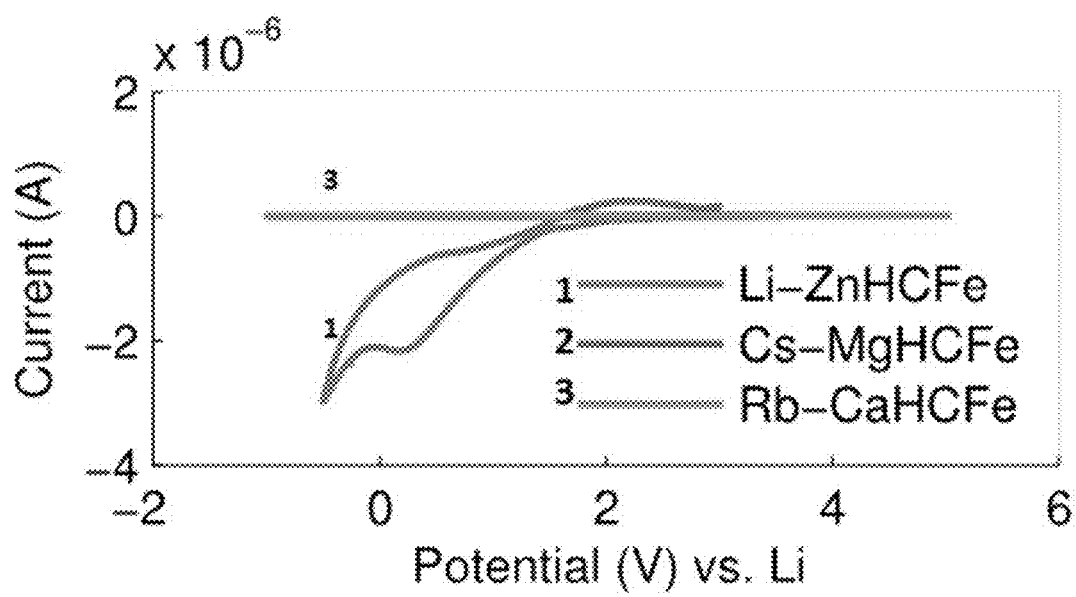
FIGS. 12A-12B: Chemical stability versus lithium.
Figure 12B:
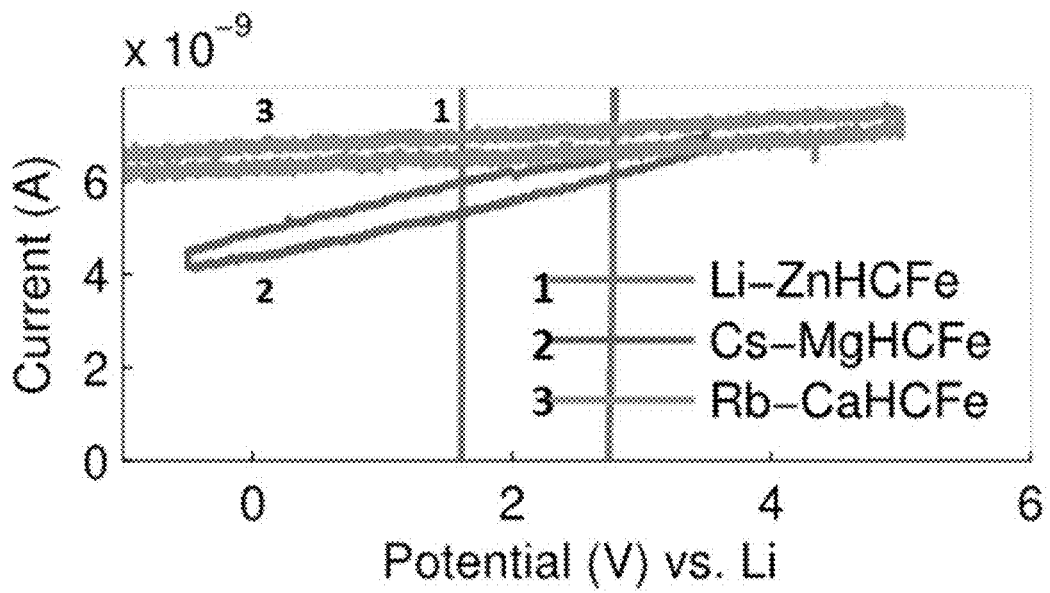

In addition to being electronically stable, suitable solid electrolytes should also be chemically/electrochemically stable when in contact with lithium metal. This was tested by running a CV where each solid electrolyte sample sits between lithium metal on one side and an ionically blocking electrode on the other side. FIGS. 12A-12B show data for Li—ZnHCFe, Cs—MgHCFe, and Rb—CaHCFe. Li—ZnHCFe exhibits certain electrochemical instability as shown by the reduction peak at approximately 0.2 V vs Li.

On the other hand, neither Cs—MgHCFe nor Rb—CaHCFe exhibits any instability when in the presence of lithium metal. The current flowing through follows an ohmic behavior and corresponds to a low level of electronic conduction. Therefore, by tuning in the crystal structure, framework ions, and insertion ions, chemical/electrochemical stability of the hexacyanometallate materials can be modified.

As used herein, the singular terms "a," "an," and "the" include plural referents unless the context clearly dictates otherwise. Thus, for example, reference to an electrode can include multiple electrodes unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A solid-state lithium-ion battery, comprising a cathode, an anode, and a solid-state electrolyte disposed between the cathode and the anode, wherein the electrolyte comprises an electrolyte material represented by $A_xP_y[R(CN)_{6-w}L_w]_z$, wherein:

A is at least one alkali metal cation,

P is at least one transition metal cation, at least one post-transition metal cation, at least one alkaline earth metal cation, or a combination thereof, R is at least one transition metal cation, L is an anion, x, y, and z are related based on electrical neutrality, and x>0, y>0, z>0, and 0≤w≤6.

2. The solid-state lithium-ion battery of claim 1, wherein the anode comprises lithium metal.

3. The solid-state lithium-ion battery of claim 1, wherein A comprises one or more of $Li^+$, $Na^+$, $K^+$, $Rb^+$ and $Cs^+$.

4. The solid-state lithium-ion battery of claim 1, wherein A comprises $Li^+$.

5. The solid-state lithium-ion battery of claim 1, wherein A comprises $Rb^+$ or $Cs^+$.

6. The solid-state lithium-ion battery of claim 1, wherein P comprises at least one transition metal cation.

7. The solid-state lithium-ion battery of claim 1, wherein P comprises cations of at least two different transition metals.

8. The solid-state lithium-ion battery of claim 1, wherein P comprises at least one post-transition metal cation.

9. The solid-state lithium-ion battery of claim 1, wherein P comprises at least one alkaline earth metal cation.

10. The solid-state lithium-ion battery of claim 1, wherein P comprises at least one alkaline earth metal cation, and wherein A comprises $Rb^+$ or $Cs^+$.

11. The solid-state lithium-ion battery of claim 1, wherein R is selected from cations of Fe, Mn, Cr, and Co.

12. The solid-state lithium-ion battery of claim 1, wherein the electrolyte material is represented by $A_xP_y[Fe(CN)_6]_z$.

13. The solid-state lithium-ion battery of claim 1, wherein the electrolyte material has an ionic conductivity of about $10^{-4}$ S/cm or more.

14. The solid-state lithium-ion battery of claim 1, wherein the electrolyte material has an electronic conductivity of about $10^{-8}$ S/cm or less.

15. The solid-state lithium-ion battery of claim 1, wherein the electrolyte material maintains its electronic conductivity when a voltage of up to 5 V is applied across the electrolyte material.

16. The solid-state lithium-ion battery of claim 1, wherein the electrolyte material is chemically stable when cycled in contact with lithium metal between 0 and 5 V versus $Li/Li^+$, and wherein the electrolyte material is substantially electrochemically inactive during operation of the battery.

17. The solid-state lithium-ion battery of claim 1, wherein the battery is substantially free of a liquid electrolyte or a polymer electrolyte.

18. The solid-state lithium-ion battery of claim 1, wherein the battery is substantially free of an electrode comprising a hexacyanometallate.

19. The solid-state lithium-ion battery of claim 1, wherein w=0.

20. The solid-state lithium-ion battery of claim 1, wherein the electrolyte material accounts for at least about 50 wt. % of the solid-state electrolyte.

21. A solid-state lithium-ion battery, comprising a cathode, a lithium metal anode, and a solid-state electrolyte disposed between the cathode and the lithium metal anode, wherein the solid-state electrolyte comprises at least about 50 wt. % of an electrolyte material represented by $A_xP_y[R(CN)_6]_z$, wherein:

A is at least one alkali metal cation,

P is at least one transition metal cation, at least one post-transition metal cation, at least one alkaline earth metal cation, or a combination thereof, R is at least one transition metal cation, x, y, and z are related based on electrical neutrality, and x>0, y>0, z>0.

22. An electric vehicle comprising the solid-state lithium-ion battery of claim 21.

* * * * *